(12) United States Patent
Kirjavainen et al.

(10) Patent No.: US 7,077,164 B2
(45) Date of Patent: Jul. 18, 2006

(54) PIPE

(75) Inventors: Kari Kirjavainen, Espoo (FI); Jyri Jarvenkyla, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 10/010,440

(22) Filed: Nov. 8, 2001

(65) Prior Publication Data

US 2002/0046776 A1    Apr. 25, 2002

Related U.S. Application Data

(62) Division of application No. 08/981,360, filed on Dec. 18, 1997, which is a division of application No. 08/981,219, filed as application No. PCT/FI96/00359 on Jun. 20, 1996.

(30) Foreign Application Priority Data

| Jun. 26, 1995 | (FI) | 953162 |
| Sep. 20, 1995 | (SE) | 9503272 |
| Apr. 4, 1996 | (FI) | 961540 |
| Apr. 29, 1996 | (FI) | 961822 |

(51) Int. Cl.
   F16L 55/00 (2006.01)

(52) U.S. Cl. .............. 138/104; 138/127; 181/206

(58) Field of Classification Search .......... 138/104, 138/127, 137, 144, 134; 181/206, 224
See application file for complete search history.

(56) References Cited

U.S. PATENT DOCUMENTS

| 2,691,698 | A | * | 10/1954 | Schmidt ................ 380/252 |
| 3,314,108 | A |   | 4/1967  | Wienand et al. ............ 18/12 |
| 3,425,455 | A |   | 2/1969  | Kilpert et al. ............ 138/143 |
| 3,721,898 | A | * | 3/1973  | Dragoumis et al. ......... 138/104 |
| 4,025,724 | A | * | 5/1977  | Davidson, Jr. et al. ..... 181/206 |
| 4,029,889 | A | * | 6/1977  | Mizuochi ............... 138/104 |
| 4,109,108 | A | * | 8/1978  | Coxon et al. ............ 181/206 |
| 4,171,465 | A | * | 10/1979 | Swinbanks .............. 181/206 |
| 4,429,213 | A | * | 1/1984  | Mathieu ................ 392/468 |
| 4,523,141 | A | * | 6/1985  | Thomas et al. ............ 324/54 |
| 4,554,650 | A | * | 11/1985 | Brown et al. ............ 367/154 |
| 4,640,313 | A |   | 2/1987  | Stanley ................. 138/141 |
| 4,783,817 | A |   | 11/1988 | Hamada et al. ............ 381/71 |
| 5,036,210 | A | * | 7/1991  | Goodman ............... 138/104 |
| 5,129,428 | A | * | 7/1992  | Winter et al. ............. 138/104 |
| 5,243,128 | A | * | 9/1993  | Marcoz ................. 174/47 |
| 5,267,670 | A | * | 12/1993 | Foster .................. 138/104 |
| 5,383,087 | A | * | 1/1995  | Noone et al. ............ 361/215 |
| 5,387,386 | A |   | 2/1995  | Kirjavainen ............. 264/173 |
| 5,414,213 | A | * | 5/1995  | Hillburn ................ 174/36 |
| 5,551,484 | A | * | 9/1996  | Charboneau ............ 138/104 |
| 5,763,034 | A | * | 6/1998  | Nishino et al. .......... 428/36.91 |
| 5,865,218 | A | * | 2/1999  | Noone et al. ............ 138/137 |
| 6,089,278 | A | * | 7/2000  | Nishino ................ 138/137 |
| 6,170,535 | B1 | * | 1/2001  | Sadr et al. ............. 138/137 |
| 6,305,423 | B1 | * | 10/2001 | De Meyer et al. ......... 138/33 |
| 6,386,237 | B1 | * | 5/2002  | Chevalier et al. ......... 138/104 |
| 6,491,994 | B1 | * | 12/2002 | Kito et al. ............. 428/36.5 |
| 6,498,991 | B1 | * | 12/2002 | Phelan et al. ............ 138/104 |
| 6,539,981 | B1 | * | 4/2003  | Kleven et al. ............ 138/143 |
| 2002/0033197 | A1 | * | 3/2002 | Zimmer et al. ............ 138/137 |

* cited by examiner

*Primary Examiner*—James Hook
(74) *Attorney, Agent, or Firm*—Ladas & Parry LLP

(57) ABSTRACT

A pipe has an innermost layer, outside of which there is an inner electrode layer, outside of which there is an insulating layer, outside of which there is an outer electrode layer. The innermost layer is made of plastic by continuous extrusion and the insulating layer is made of foamed plastic.

16 Claims, 4 Drawing Sheets

PIPE

Figure 1:
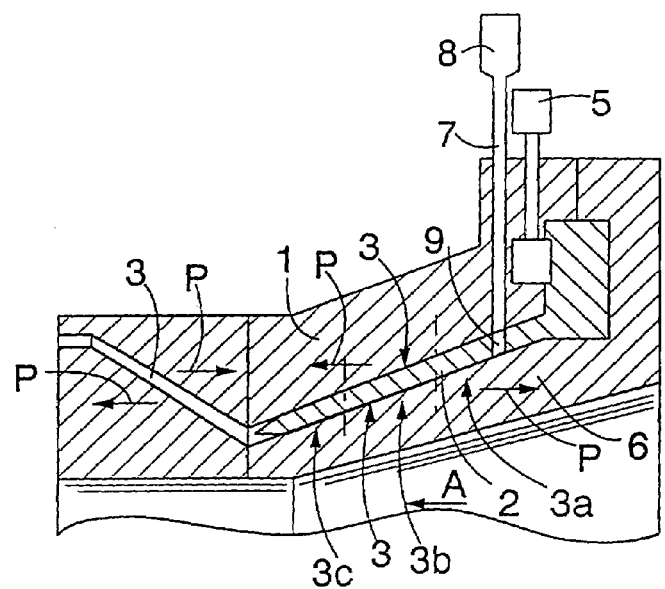

This application is a divisional of application Ser. No. 08/981,360 filed on Dec. 18, 1997, which is a divisional of Ser. No. 08/981,219 filed on Oct. 8, 1998 now abandoned, which is PCT/FI96/00359 filed on Jun. 20, 1996, which designated the U.S., was published in English, claims the benefit thereof and incorporates the same by reference.

The invention relates to a pipe made of several different materials by continuous extrusion.

In this type of extrusion apparatus, pressures are high and mechanical stresses are great in the nozzle section, i.e. in the area of the central extrusion conduit. The present structures also needlessly prevent some of the possibilities of use of the apparatus.

The pipe according to the invention is characterized in that the innermost layer is a plastic layer, outside of which there is an inner electrode layer, outside of which there is an insulating layer, outside of which there is an outer electrode layer.

With the nozzle construction according to the invention which expands outwards and in which the feed gap enlarges after it has contracted, the pressure acting on the structures of the extrusion apparatus can be considerably balanced, i.e. the apparatus can be made more durable.

Also, especially if the feed gap opens on the outer circumference of the extrusion apparatus or near it, it is highly preferable that an actuator provided for each rotor and the means of the actuator driving the rotor are placed at the back of the extrusion apparatus in such a way that the actuator is positioned in the radial direction of the extrusion apparatus within the outlines determined by the other components of the extrusion apparatus. In such a case, the extrusion apparatus can be easily made such that the nozzle section determines the outer dimensions of the entire extrusion apparatus in the radial direction, whereupon the possibilities of use of the apparatus increase considerably.

A new possibility presents itself for example when the extrusion apparatus is connected to operate together with a corrugator used for preparing for example corrugated pipes, and the extrusion apparatus can be placed inside the corrugator altogether. At present, material must be fed into the corrugator with a long nozzle, so that the material travels in the apparatus for a long time and a great amount of stabilizer is needed. When used with a corrugator, the extrusion apparatus can also be formed with a double cone structure in order to manufacture a two-layer corrugated pipe.

Placing the actuator(s) at the back of the extrusion apparatus also enables the use of the apparatus at the rear of a hole-making machine for example underground, whereupon the extrusion apparatus is arranged to prepare a plastic pipe in the hole made by the machine. The fact that it is very easy to construct the conical extruder in such a way that there is a considerable hole through the extruder makes the connection to the hole-making machine easy. Another new possibility results from the fact that the extrusion apparatus can also be used for coating e.g. steel pipes from the inside. In such a case, the inner surface of a steel pipe can be simultaneously coated with thermally insulating adhesion plastic and with an inner layer made of for example PEX placed inside the adhesion plastic. Such pipes can be joined for example with a cross-linked plastic sleeve.

In all embodiments where the actuators are situated at the back of the extrusion apparatus, the supply of the plastic material to the apparatus must naturally also be arranged from the rear.

Figure 2:
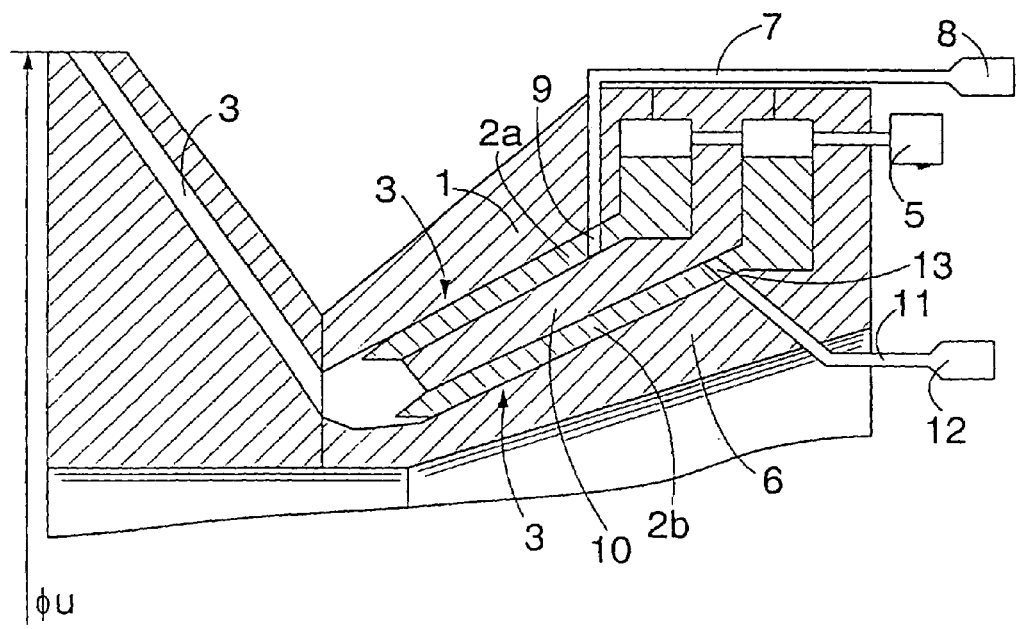
Figure 3:
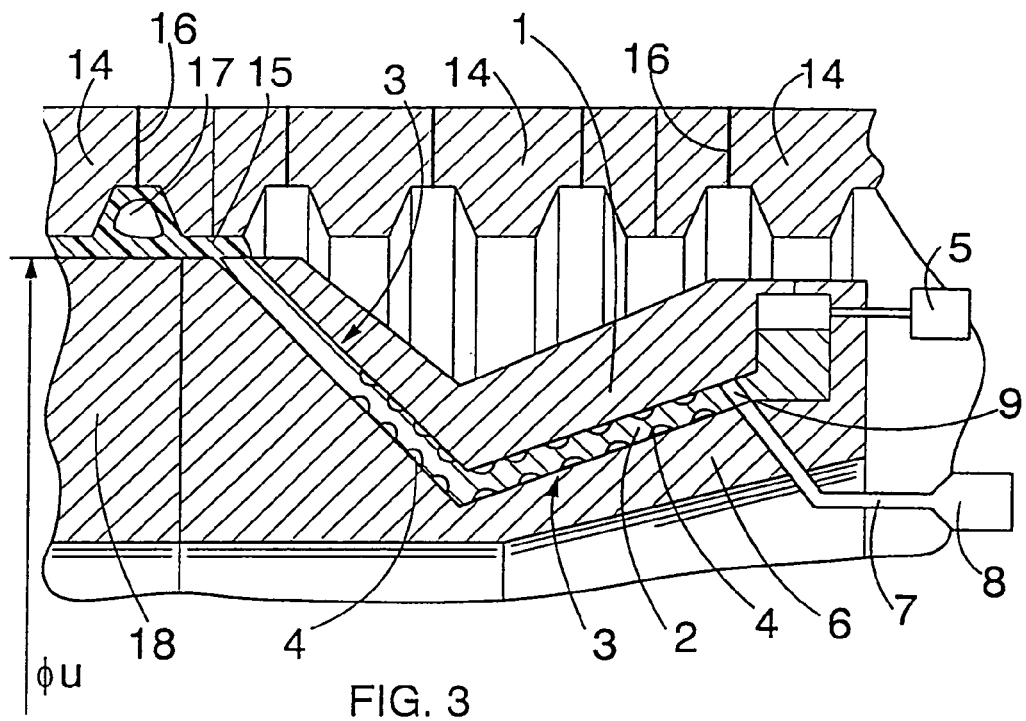
Figure 4:
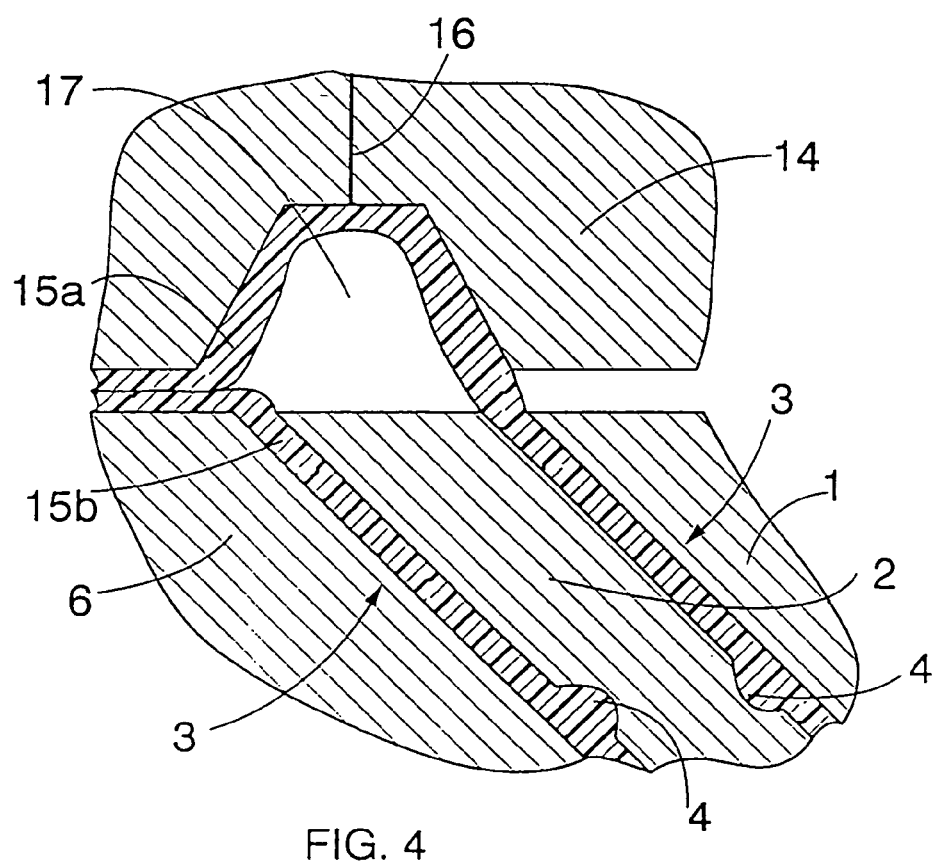
Figure 5:
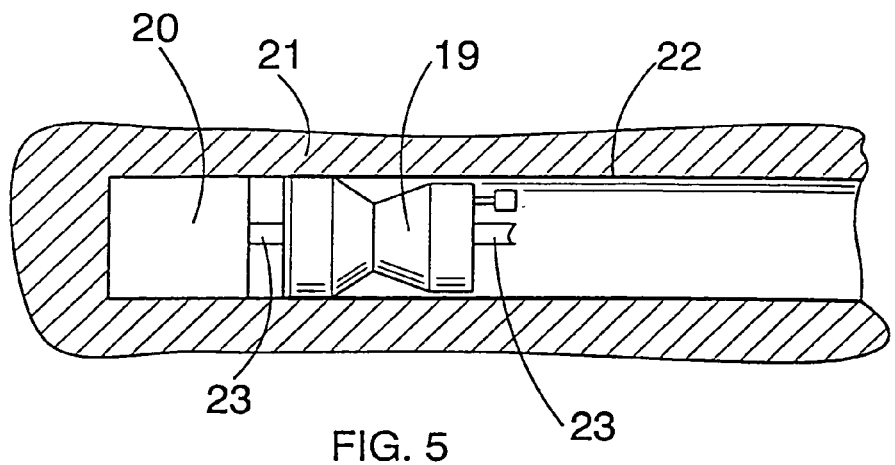
Figure 6:
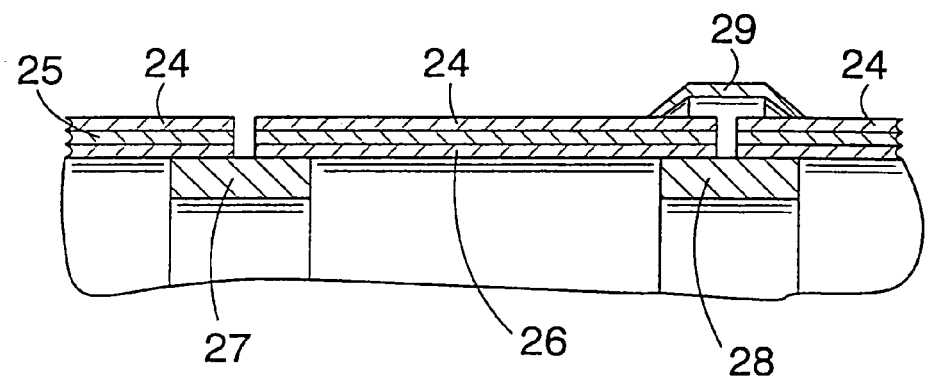
Figure 7:
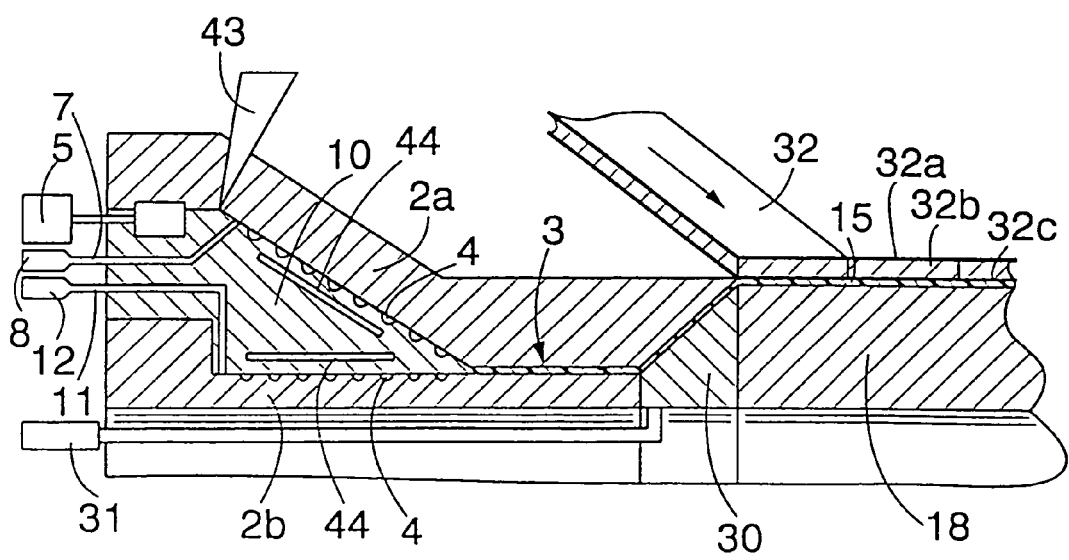
Figure 8:
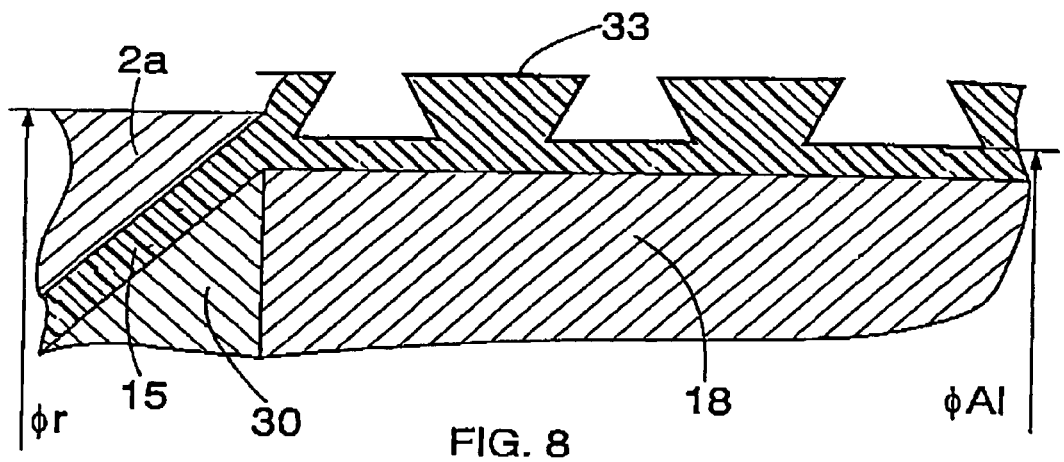
Figure 9:
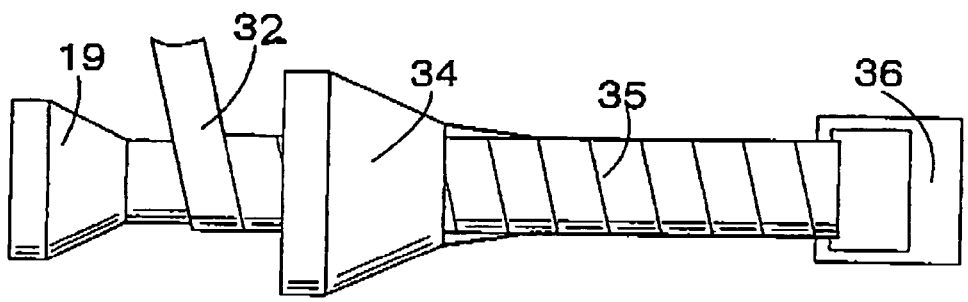
Figure 10:
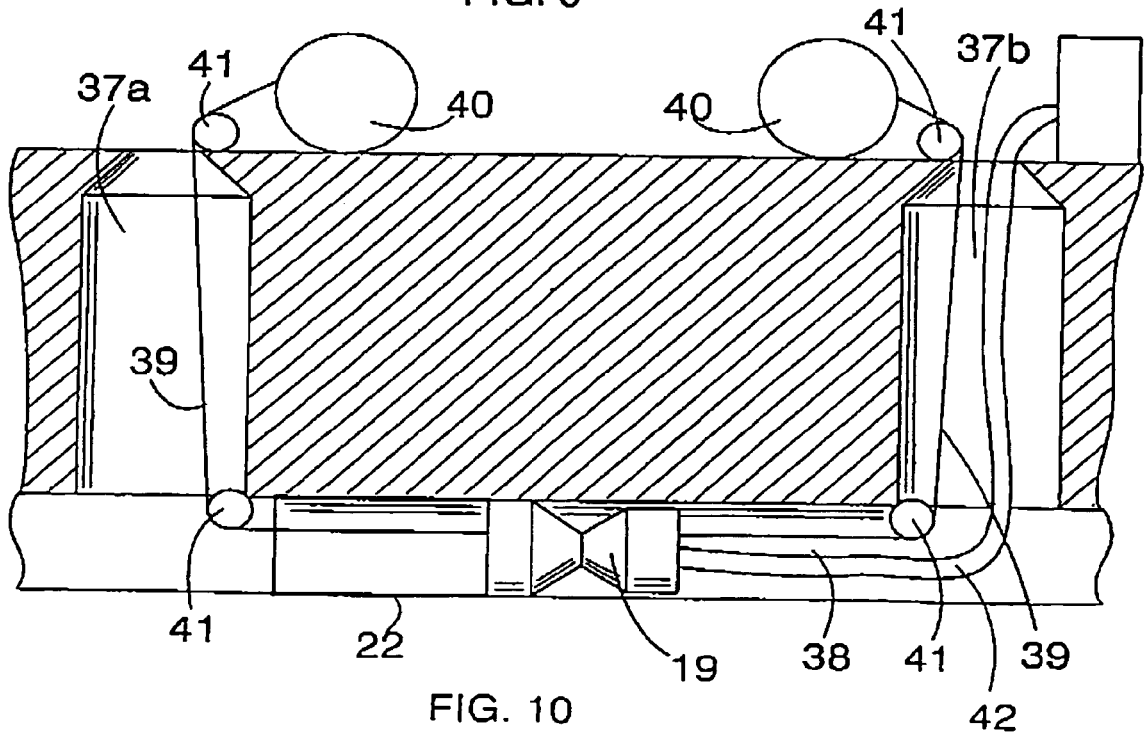

In the following, the invention will be described in greater detail with reference to the accompanying drawings, in which FIG. 1 is a longitudinal cross-sectional side view of an upper portion of a simple embodiment of a extrusion apparatus provided with a radially expanding nozzle section, FIG. 2 is a longitudinal cross-sectional side view of an upper portion of another embodiment of an extrusion apparatus where the rotating mechanisms for the rotors are placed at the back of the extrusion apparatus, FIG. 3 is a longitudinal cross-sectional side view of an upper portion of a third extrusion apparatus placed inside a corrugator, FIG. 4 shows a detail of the apparatus of FIG. 3, FIG. 5 shows an extrusion apparatus moving at the rear of an underground hole-making machine and preparing a plastic pipe in the hole made by the machine, FIG. 6 is a cross-sectional view of a pipe coated with the apparatus of FIG. 5, FIG. 7 is a longitudinal cross-sectional side view of an upper portion of a fourth extrusion apparatus according to the invention, FIG. 8 shows a detail of the apparatus of FIG. 7, FIG. 9 shows the coating of a pipe from the outside and the inside with two different extrusion apparatuses, and FIG. 10 shows the coating of a pipe positioned in place from the inside with an extrusion apparatus, FIG. 1 shows a simple extrusion apparatus for extruding plastic material, in which case the plastic material is fed into the apparatus either in a fixed, preferably powdery or granular, form or either entirely or partly melted. This extrusion apparatus comprises an outer stator 1, a rotor 2, an inner stator 6, an annular feed gap 3 situated between the outer stator 1 and the rotor 2, and correspondingly another annular feed gap 3 situated between the inner stator 6 and the rotor 2 for the plastic material to be extruded, and an actuator 5 for rotating the rotor 2.

The rotor 2 is conical, and the surfaces of the stators 1 and 6 are conical at least on the side of the rotor 2, i.e. at least the inner surface of the outer stator 1 and the outer surface of the inner stator 6 are conical. The actuator 5 comprises a motor and for example a pinion system or a gear system. The motor may be for example a hydraulic motor, an electric motor or some other motor that is known per se and that is suitable for the purpose. Hydraulic drive is particularly advantageous for example when the extrusion apparatus is used in connection with an underground hole-making machine, in which case the hole-making machine and the extrusion apparatus may share the power supply. If the actuator 5 comprises a gear system, the speed of rotation of the rotor 2 can be adjusted with the system in a desired manner. On the other hand, for example when an electric motor is used the gear system is not necessary, since the speed of rotation of the rotor 2 can be regulated easily by adjusting the speed of rotation of the motor in a manner known per se.

The extruder further comprises a supply conduit 7 along which the material to be extruded can be fed into the feed gap 3. The material to be fed into the supply conduit 7 is supplied by a feeding device 8. The feeding device 8 can be for example a feed screw, a pump or some other device known per se. With the feeding device, the flow rate of the material to be fed into the supply conduit can be adjusted. The material to be supplied can be conducted from the supply conduit 7 to the feed gap 3 between the outer stator 1 and the rotor 2. The rotor 2 further comprises openings 9 via which some of the material situated in the supply conduit 7 can flow into the interior of the rotor 2 into the feed gap 3 between the inner stator 6 and the rotor 2. It is also possible to use separate supply conduits and feeding devices for separately feeding the material to be supplied into the exterior and interior of the rotor 2 in a manner known per se. When the rotor 2 is rotated, the material to be extruded flows in the direction of flow A in the extrusion apparatus by the action of grooves provided in the rotor 2 and/or in the stators. For the sake of clarity, these grooves are not shown in the figure.

The diameter of the annular feed gap 3 decreases at first continuously in the direction of flow A of the lastic material to be extruded, and the feed gap comprises firstly a feed zone 3a, then a melting zone 3b and at the end a compression zone 3c in the aforementioned direction of flow A. After the rotor 2, the feed gaps 3 provided on different sides of the rotor 2 come together as one feed gap 3. In order to balance the pressures P and the stresses, the diameter of the central feed gap 3 correspondingly increases continuously at a section of the length of the gap in the direction of flow A of the plastic material to be extruded after the feed gaps 3 from the different sides of the rotor 2 have come together as one feed gap 3. In this exemplary embodiment, the diameter of the feed gap 3 increases linearly immediately after the rotor 2, and the end section of the gap has a constant diameter, i.e. the gap is parallel with the central axis of the extrusion apparatus.

FIG. 2 is a cross-sectional side view of a second extrusion apparatus according to the invention. The reference numerals in FIG. 2 correspond to those in FIG. 1. The extruder according to FIG. 2 comprises two conical rotors, an outer rotor 2a being placed between an outer stator 1 and an intermediate stator 10 and an inner rotor 2b being placed between an inner stator 6 and the intermediate stator 10. For the sake of clarity, the figure does not show grooves provided in the rotors and/or the stators. An actuator 5 is arranged to rotate the rotors 2a and 2b. The speeds of rotation of the rotors 2a and 2b can be adjusted differently, if desired, and/or their speeds of rotation can be made adjustable independently of each other. Material is supplied to feed gaps 3 situated on the outside and inside of the outer rotor 2a by means of a supply conduit 7 and a feeding device 8. Correspondingly, material is supplied to the interior of the inner rotor 2b and via openings 13 to the exterior of the rotor by means of a second supply conduit 11 and a second feeding device 12.

The feed gap 3 opens on the outer circumference of the extrusion apparatus. The actuator 5 and the feeding devices 8 and 12 are placed at the back of the extrusion apparatus in such a way that they are positioned in the radial direction of the extrusion apparatus within the outlines determined by the outermost point of the feed gap 3 of the extrusion apparatus, this outer circumference being denoted in the accompanying figure by Øu.

FIG. 3 shows a third extrusion apparatus according to the invention placed inside a corrugator. The reference numerals in FIG. 3 correspond to those in FIGS. 1 and 2. The corrugator comprises chill moulds 14 that move forward and that have a grooved inner surface against which the plastic mass 15 is pressed in order to prepare a ribbed pipe. Since the structure of the corrugator is known per se, it will not be discussed in greater detail in this connection. The feeding device 8 and the actuator 5 for rotating the rotor 2 are placed at the back of the extrusion apparatus in such a way that they are positioned in the radial direction inside the outermost part of the feed gap 3, i.e. inside the outer circumference Øu. The extrusion apparatus can then be placed inside the corrugator, and there is no need for long nozzles where the plastic mass 15 easily cools too much before arriving at the grooves of the chill moulds 14. The initial section of the rotor 2 has the shape of a tapering cone and the end section of the rotor has the shape of an expanding cone. The rotor 2 thus forms on each side separate feed gaps 3 that extend to the outer circumference Øu of the extrusion apparatus. The rotor 2 comprises grooves 4 that transport the material to be extruded out from the extruder. However, at the end of the rotor 2 there is a smooth area comprising no grooves. The material to be extruded thus forms a smooth flow and comprises substantially no seams produced by the grooves. Further, the groove-free area produces and maintains a helical orientation field. This orientation is frozen into the product when the parison to be extruded meets the chill moulds.

At the bottoms of the grooves of the chill moulds 14, there are suction ducts 16 the suction of which ensures that the plastic mass 15 reaches all the way to the bottom of the grooves of the chill moulds 14. Further, by suitably conducting the material flows of the plastic mass 15 flowing on different sides of the rotor 2, it is possible to produce a pipe comprising openings 17 at the grooves of the chill moulds. The extrusion apparatus further comprises a mandrel 18, and the plastic pipe is formed as the chill moulds 14 and the mandrel 18 press the plastic pipe preform from different sides.

FIG. 4 shows a detail of the apparatus of FIG. 3. The reference numerals in FIG. 4 correspond to those in FIGS. 1 to 3. FIG. 4 shows clearly how the apparatus produces an opening 17 in the corrugated pipe. The plastic mass flows 15a and 15b are conducted in such a way that the plastic pipe to be extruded will comprise two layers. Instead of the suction ducts 16, the opening 17 could be formed by means of blowing that is arranged to blow air or some other suitable gas through the rotor 2 in order to produce the opening 17.

FIG. 5 shows schematically an extrusion apparatus according to the invention placed in connection with an underground hole-making machine. The hole-making machine 20 is arranged to make a hole in the soil 21. The extrusion apparatus 19 in turn is arranged to move in connection with the hole-making machine 20 and to simultaneously produce a plastic pipe 22 in the hole made by the hole-making machine 20. The control and actuator connections 23 of the hole-making machine 20 can be made to pass through the hollow extrusion apparatus 19. For the sake of clarity, FIG. 5 does not show the means required for moving the hole-making machine 20 and the extrusion apparatus 19.

FIG. 6 shows a steel pipe which is coated with plastic from the inside and in which the layer situated against the steel 24 is thermally insulating adhesion plastic 25 and the second layer is cross-linked polyethylene, i.e. PEX 26. The adhesion plastic 25 can be for example grafted polyethylene. The adhesion plastic 25 is preferably foamed. When the steel pipe is coated from the inside, the coating plastic is hot in the beginning so that its diameter remains large, whereas when the plastic cools the diameter of the plastic layer tends to decrease. The foamed adhesion plastic 25 sticks to the surface of the steel pipe but allows the inside to shrink. In such a case, the foam bubbles stretch in the radial direction, i.e. the foam bubbles are oriented radially, which increases the strength of the pipe. The foamed adhesion plastic 25 comprises preferably at least 10%, most preferably about 25%, of fine filling agent, such as calcium carbonate. The elastic modulus of the foam can thus be made high, i.e. the structure will be strong. Further, the foamed adhesion plastic 25 is a very good heat insulator against the PEX 26. On the other hand, when a steel pipe is coated from the inside, the orientation of the plastic pressed inside can be frozen efficiently, since the steel pipe cools the pipe effectively from the outside. When steel pipes coated in this manner are to be joined together, for example a cross-linked plastic sleeve 27 that is compressed and warmed in place can be used. The cross-linked plastic sleeve 27 tends to return to the size of the diameter preceding the compression, and the expansion is provided by means of heating. The joint will then be extremely tight. It is also possible to use for the joint a sleeve 28 that is provided in the outside with mastic or some other adhesive with which the sleeve 28 can be made to stick to the pipe. Electrofusion can also be used. At the outside of the joint, it is possible to place a clamping collar 29 that is made of a strong material and that can be positioned to rest on a metal casing, such as steel 24. The clamping collar 29 receives axial tensile forces. The joint can also be implemented by welding, so that the adhesion plastic 25 acts as a good heat insulator against the innermost layer. The coating of steel pipes can be realized by applying the principle shown in FIG. 5. Other metal pipes and concrete pipes can also be coated in a similar manner.

FIG. 7 is a cross-sectional side view of an extrusion apparatus according to the invention. The reference numerals in FIG. 7 correspond to those of FIGS. 1 to 6. The extrusion apparatus of FIG. 7 comprises one fixed stator, an intermediate stator 10. At the outside of the stator there is a rotatable outer rotor 2a and at the inside there is a rotatable inner rotor 2b. The surface of the intermediate stator 10 on the side of the outer rotor 2a is conical and correspondingly the surface of the outer rotor 2a on the side of the intermediate stator 10 is conical. The intermediate stator 10 comprises grooves 4 that transport the material to be extruded between the intermediate stator 10 and the outer rotor 2a out of the extrusion apparatus as the outer rotor 2a rotates. According to a corresponding principle, the inner rotor 2b comprises grooves that transport the plastic material to be extruded out of the extrusion apparatus as the inner rotor 2b rotates. For the sake of clarity, the accompanying figure only shows an actuator 5 rotating the outer rotor 2a. For the inner rotor 2b there may be one or several actuators. It is also possible to place one common actuator to rotate both the outer rotor 2a and the inner rotor 2b, whereupon each rotor is rotated by the same pinion so that the rotors naturally rotate in opposite directions. If each rotor has its own actuator, the directions of rotation of the rotors can naturally be selected to be the same or opposite. The inner rotor 2b is followed by a rotatable expansion cone 30. The expansion cone 30 is rotated with a rotating means 31. With the rotating means 31 the expansion cone 30 can be rotated either at the-same or a different speed with the inner rotor 2b in the same or different direction according to the desired orientation. The extrusion apparatus according to the invention is arranged to prepare the innermost pipe of a multilayer pipe and the apparatus comprises means for producing the outer layer of the pipe, the means preparing the outer layer by winding a strip 32 spirally into a pipe. These means are not shown in the figure for the sake of clarity. The extrusion apparatus of FIG. 7 makes the plastic mass 15 of the inner pipe move in a rotating manner so that the layers can be caused to stick together very well. The mandrel 18 may also be cooled, so that as the strip 32 and the mandrel 18 cool the plastic mass 15, the orientation of the mass can be frozen very efficiently. The strip 32 may be made of for example glass fibre or it may be a polypropylene strip oriented in one direction.

However, the strip 32 preferable consists of a totally covering outer electrode layer 32a, separating, electrically insulating continual segments 32b and an inner electrode layer 32c. The outer electrode layer 32a can be made of for example electrically conductive plastic or aluminum foil on strip 32. The insulating layer of continual segments 32b can be for example sintered for normal foamed plastic the cells of which comprises for example a filler. The foamed plastic preferably contains holes so that for example air passes through it. The inner electrode layer 32c can have a similar structure as the outer electrode layer 32a.

This provides a hollow pipe that can be used for example in such a way that as a nail passes through the pipe, a short circuit occurs between the electrode layers as would not necessarily result if the electrode layers were not totally covering, whereby this description necessarily confirms the total covering of the electrode layers that is shown in FIG. 7. for example, when FIG. 7 is considered in the circumferentially full structure for makmnn the pipe 15 shown only in section. Just as no one would assume from FIG. 7 that the pipe 15 shown in FIG. 7 had radial holes through it, as this would make it a leaky pipe, no one would assume radial holes through the electrodes 32a, 32c that are shown coverinn the inside and outside of the continuous pipe clearly implied by FIG. 7. Therefore, the pipe warns the user of a serious breakdown and the pipe can be used for example as a gas pipe inside a building.

On the other hand, a potential difference can be created between the electrode layers, whereupon as the surface of the pipe is pressed in some place for example by a stone, the change in the potential difference of the insulating layers can be detected by a voltmeter. The application of the pipe is useful for example when laying the pipe in the ground, and for example problems caused by an excessive traffic load can be taken into account in such a situation. In the same way it is possible to detect an excessive increase of the pressure inside the pipe. The alarm levels of the pipe can be determined easily by adjusting the outside ring stiffness of the pipe with respect to the inside stiffness and the hardness of the foam. On the other hand, when the pipe is used as a ventilation or a soil and waste pipe inside a building, noise of the sewer in the pipe can be detected and a counter-wave can be correspondingly produced in the outside to muffle the noise occurring in the pipe. Further, it is possible to use the outer surface to produce a sound, for example a warning signal.

The potential difference between the electrode layers can also be used as a moisture barrier, so that water molecules cannot corrode the surface of the pipe. Correspondingly, when the insulating layer becomes damp, it affects the potential difference, wherefore the pipe can be used as a sensor for locating leakage for example in district heating pipes. The strength of the pipe is also excellent for example when aluminum is used for the electrode layer. The electrode layers can naturally be used for example for electrically heating or for locating the pipe, since for example aluminum can be easily detected from the ground by means of, e.g., a metal detector. On the other hand, sound signals can also be suppled to the electrodes and the audible sound can be used to facilitate the location.

The insulating or insulation foam layer 32b of continual segments situated between the electrodes can also be modified for example with carbon black so that it is partially conductive, whereupon the compression of the insulator directly affects for example the potential difference. The application for use in sprinklers is also possible since this fast warming of the metal foil affects the electric connection between the films. Due to its great strength originating from the combination of metal and oriented plastic (again implying totally covering electrode layers 32a, 32c) and the possibilities of using alarm signals, the pipe is also applicable for offshore gas and oil pipes and for large trunk lines, for instance. It seems possible that by feeding high-frequency oscillation into a pair of electrodes, bacterial growth on the outer and/or inner surface of the pipe can be prevented.

The electrode layers can be positioned in such a way that the outer electrode layer 32a is more rigid, whereupon the pipe reacts mainly to signals arriving from the inside, or in such a way that the inner electrode layer is more rigid, whereupon the pipe reacts mostly to signals from the outside.

The apparatus of FIG. 7 can also be arranged to rotate as a whole by mounting the extrusion apparatus in bearings from the end so that it rotates, whereupon for example the accumulation of tolerances can be avoided in the manufacture of films. In this case, the material of the tubular product comes out from the extruder rotating, and naturally the haul-off must be of rotating type too. There may be wedges 43 outside the apparatus, the outer rotor 2a being moved in the radial direction by means of the wedges. In this way, the thickness of the outer layer of the plastic material 15 produced by the apparatus can be adjusted. The rotating cone 30 can be made axially movable, whereupon by changing the place of the rotating cone 30 it is possible to adjust the thickness of the inner layer of the material 15 to be extruded. By feeding the material to be extruded with separate supply conduits to different sides of the intermediate stator 10, the material flow can be adjusted by means of the feeding devices so that the material flows to be supplied to each side determine the thicknesses of the different layers. The outer rotor 2a, the inner rotor 2b and the expansion cone 30 preferably rotate in the same direction, whereupon the plastic material to be extruded is wound tightly together with the strip 32 to be supplied and the pipe to be extruded will form an even construction. The intermediate stator 10 comprises electric resistors 44, whereupon the material to be extruded can be heated mainly from the middle of the material through the intermediate stator 10, so that the heating can be realized effectively.

FIG. 8 shows a detail of the apparatus of FIG. 7. The reference numerals in FIG. 8 correspond to those in FIGS. 1 to 7. In the case of FIG. 8, instead of the strip 32, an aluminium strip 33 is supplied to form the outer layer. The aluminium strip 33 can be attached to the adjacent aluminium profile in the spiral formed by the strip for example by means of a continuous weld, spot welding or gluing or in some other manner known per se. The aluminium strip 33 may also comprise grooves as shown in FIG. 8. In such a case, the diameter Ør of the outermost supply flow of the mass 15 to be supplied is made preferably greater than the smallest inner diameter ØA1 of the aluminium profile 33, whereupon the compression of the plastic mass 15 to the bottom of the grooves can be ensured and a very strong aluminium-coated plastic pipe can be manufactured. Instead of a flat aluminium profile, the profile can be of plastic material having e.g. a hollow square cross-section which will greatly enhance the ring stiffness of the pipe. This type of stiff pipe with an inside liner oriented with tensile strength can be used for example in pressure sewage applications.

FIG. 9 shows yet another application of an extrusion apparatus according to the invention. The reference numerals in FIG. 9 correspond to those in FIGS. 1 to 8. A plastic layer is supplied by the extrusion apparatus 19 for the interior of the pipe to be totally covered by the aluminium strip 32. A transparent plastic layer 35 is then supplied on the aluminium strip covered pipe with a second extrusion apparatus that is conical. The pipe is pulled with a pulling device 36 in such a way that the plastic layer supplied with the extrusion apparatus sticks to the surface of the pipe a t distance from the extrusion apparatus 34 as shown. The pulling device can be rotatably connected. The pulling of the pipe succeeds since, due to the layer 32 made of aluminium or some other metal, the pipe stands stretching well. Axial orientaiton is thus produced in the plastic layer 35.1 The extrusion apparatus 19 provides the inside of the aluminium strip-wrapped pipe as a plastic layer of circumferential orientation. A pipe is thus obtained that comprises a totally covering aluminium layer with a circumferentially (or, possibly, axially) oriented plastic layer inside and an axially oriented plastic layer outside, wherefore the resulting pipe is very strong.

FIG. 10 schematically shows the use of an extrusion apparatus according to the invention for coating sewage pipes from the inside. The devices required can be installed underground for the interior coating of a sewage pipe 38 via a first drain pit 37a and a second drain pit 37b. The extrusion apparatus 19 is moved in the sewage pipe 38 by pulling it with a cable wire 39. The cable wire 39 is wound on a reel 40. The cable wire 39 is guided by means of control rolls 41. In the case of FIG. 10, the extrusion apparatus 19 is first pulled by the cable wire 39 near the first drain pit 37a. The extrusion apparatus is then set into action to produce a plastic pipe 22 and it is pulled with the cable wire 39 towards the second drain pit 37b. The supply of the material and energy to the extrusion apparatus 19 can be realized along a duct 42 from a unit situated on the ground. The extrusion apparatus 19 can naturally also be placed in such a way that it prepares the plastic pipe 22 in the opposite direction as viewed in FIG. 10.

The invention is described above by means of only a few preferred embodiments. It is clear for a person skilled in the art, however, that the invention is not restricted to the above examples, but the different embodiments of the invention may vary within the scope of the appended claims. Therefore, the simplest form of the extrusion apparatus comprises only one fixed stator and one rotatable rotor between which there is a conical feed gap. The method and the apparatus according o the invention can naturally also be used for preparing for example oriented films or high-pressure pipes or hoses.

The invention claimed is:

1. A hollow pipe made of several different materials by continuous extrusion, wherein an innermost layer is a hollow plastic layer totally covered outside by an inner electrode layer, outside of which there is an electrically insulating layer totally covered outside by an outer electrode layer, the electrically insulating layer electrically separating the electrode layers from each other and being thicker than either of the electrode layers.

2. A pipe according to claim 1 for conducting gas indoors, wherein the electrode layers are connected electrically in such a way that the perforation of the electrode layers brings about an alarm.

3. A pipe according to claim 1, wherein the electrode layers are connected electrically in such way that a strain resulting from the loading of the pipe produces a warning signal.

4. In a pipe according to claim 1, wherein the pipe is used as a ventilation or a soil and waste pipe, the improvements comprising noise detecting means and counter-wave producing means, wherein the electrode layers are connected electrically in such a way that the outer electrode layer produces a sound that is opposite to a signal measured from inside the pipe so that a counter-wave produced in the outer electrode layer muffles noise occurring inside the pipe.

5. In a hollow pipe, the improvements comprising a hollow innermost layer totally covered outside by an inner electrode layer, outside of which there is an electrically insulating layer totally covered outside by an outer electrode layer, wherein the innermost layer is plastic of continuous extrusion, the electrically insulating layer is foamed plastic, and the electrically insulating layer electrically separates the electrode layers from each other.

6. A pipe according to claim 5, wherein the foamed plastic contains holes.

7. A pipe according to claim 6, wherein cells of the foamed plastic comprise a filler.

8. A pipe according to claim 5, wherein cells of the foamed plastic comprise a filler.

9. A pipe according to claim 5, wherein the electrode layers are connected electrically in such a way that a perforation of the electrode layers makes a short circuit.

10. A pipe according to claim 5, wherein the electrode layers are connected electrically in such a way that a strain from loading of the pipe changes a potential difference between the electrode layers.

11. A pipe according to claim 5, wherein the inner electrode layer, the electrically insulating layer and the outer electrode layer are formed simultaneously by continuous extrusion.

12. A pipe according to claim 11, wherein the foamed plastic contains holes.

13. A pipe according to claim 12, wherein cells of the foamed plastic comprise a filler.

14. A pipe according to claim 11, wherein cells of the foamed plastic comprise a filler.

15. A pipe according to claim 11, wherein the electrode layers are connected electrically in such a way that a perforation of the electrode layers makes a short circuit.

16. A pipe according to claim 11, wherein the electrode layers are connected electrically in such a way that a strain from loading of at least one of the layers changes a potential difference between the electrode layers.

* * * * *